United States Patent
Takasan et al.

(10) Patent No.: US 7,638,927 B2
(45) Date of Patent: Dec. 29, 2009

(54) VIBRATION ACTUATOR

(75) Inventors: Masaki Takasan, Aichi (JP); Hirohiko Ishikawa, Aichi (JP); Kazuo Seiki, Aichi (JP); Tsuyoshi Kodera, Aichi (JP); Kitaru Iwata, Aichi (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 154 days.

(21) Appl. No.: 11/991,767

(22) PCT Filed: Feb. 14, 2007

(86) PCT No.: PCT/JP2007/052607

§ 371 (c)(1),
(2), (4) Date: Mar. 7, 2008

(87) PCT Pub. No.: WO2007/116607

PCT Pub. Date: Oct. 18, 2007

(65) Prior Publication Data

US 2009/0267455 A1    Oct. 29, 2009

(30) Foreign Application Priority Data

Apr. 10, 2006  (JP) ............................... 2006-107599

(51) Int. Cl.
    *H02N 2/12*   (2006.01)
(52) U.S. Cl. ........................... 310/323.09; 310/323.12; 310/323.13; 310/323.16
(58) Field of Classification Search ............ 310/323.09, 310/323.12, 323.13, 323.16
    See application file for complete search history.

(56) References Cited

U.S. PATENT DOCUMENTS

| 6,497,201 | B1 * | 12/2002 | Werson ................... 123/41.12 |
| 2004/0212278 | A1 * | 10/2004 | Miyazawa .................. 310/328 |

FOREIGN PATENT DOCUMENTS

| JP | 5-38170 | 2/1993 |
| JP | 11-220892 | 8/1999 |
| JP | 2006-5975 | 1/2006 |

OTHER PUBLICATIONS

International Search Report of corresponding International Application No. PCT/JP2007/052607, mailed May 15, 2007.

* cited by examiner

*Primary Examiner*—Walter Benson
*Assistant Examiner*—Bryan P Gordon
(74) *Attorney, Agent, or Firm*—Locke Lord Bissell & Liddell LLP

(57) ABSTRACT

Provided is a vibration actuator in which a plurality of rotors can be driven by a single vibration unit.

Two rotors (A) and (B) are attracted toward corresponding stators to be contacted with and pressurized against the corresponding stators (3) and (4), respectively, through a tension of a wire member (8). A composite vibration combining a plurality of vibrations is generated by a composite vibrator (2) to cause elliptical movements in corner portions of the stators (3) and (4). As a result, the two rotors (A) and (B) abutting onto and pressurized against the two stators (3) and (4) are rotated about rotation centers (C1) and (C2) thereof, respectively, at the same time.

14 Claims, 15 Drawing Sheets

VIBRATION ACTUATOR

TECHNICAL FIELD

The present invention relates to a vibration actuator, and more specifically, to a vibration actuator in which a stator is caused to vibrate by a vibration means, thereby rotating a rotor in contact with the stator.

BACKGROUND ART

For example, Patent Document 1 discloses a vibration actuator employing ultrasonic vibration to rotate a rotor. The vibration actuator has a composite vibrator as a vibration means, the vibrator including a plurality of piezoelectric element plates overlapping each other. A stator is arranged on one end portion of the composite vibrator, and a single rotor is supported by the stator so as to contact with the stator. By applying driving voltages to the plurality of piezoelectric element plates of the composite vibrator, a plurality of vibrations in different directions are generated and combined with each other to form a composite vibration. Then, the composite vibration causes the stator to vibrate, thereby rotating the rotor.

Patent Document 1: JP 11-220892 A

DISCLOSURE OF THE INVENTION

Problems to be Solved by the Invention

However, in the vibration actuator of Patent Document 1, a single composite vibrator rotates a single rotor. Therefore, when it is intended to rotate a plurality of rotors, respectively, it is necessary to provide a plurality of dedicated composite vibrators corresponding to the rotors, and to control driving of the plurality of composite vibrators independently of each other, thereby making the vibration actuator complicated.

The present invention has been made to solve the above-mentioned problems. It is an object of the present invention to provide a vibration actuator in which a plurality of rotors can be driven by a single vibration means.

Means for Solving the Problems

A vibration actuator according to the present invention includes: two stators; two rotors arranged so as to be in contact with the two stators; a single vibration means arranged between the two stators for generating a composite vibration combining a plurality of vibrations in different directions to vibrate the two stators, thereby rotating the two rotors at the same time; and a preload means including at least one attracting member which passes through rotation centers of the two rotors regardless of rotation angles of the two rotors and has flexibility, the preload means pressurizing the two rotors against the corresponding stators, respectively, through tension of the attracting member.

Note that, in the present invention, the word "preload" refers to a pressure for pressurizing the rotor against the stator.

Effect of the Invention

According to the present invention, it is possible to obtain a vibration actuator capable of driving a plurality of rotors by a single vibration means.

BRIEF DESCRIPTION OF THE DRAWINGS

FIG. 9b is a view showing displacement in the Y-axis direction of each portion of the actuator main body shown in FIG. 9a.

BEST MODES FOR CARRYING OUT THE INVENTION

Hereinafter, embodiments of the present invention will be described with reference to the drawings.

First Embodiment

Figure 1:
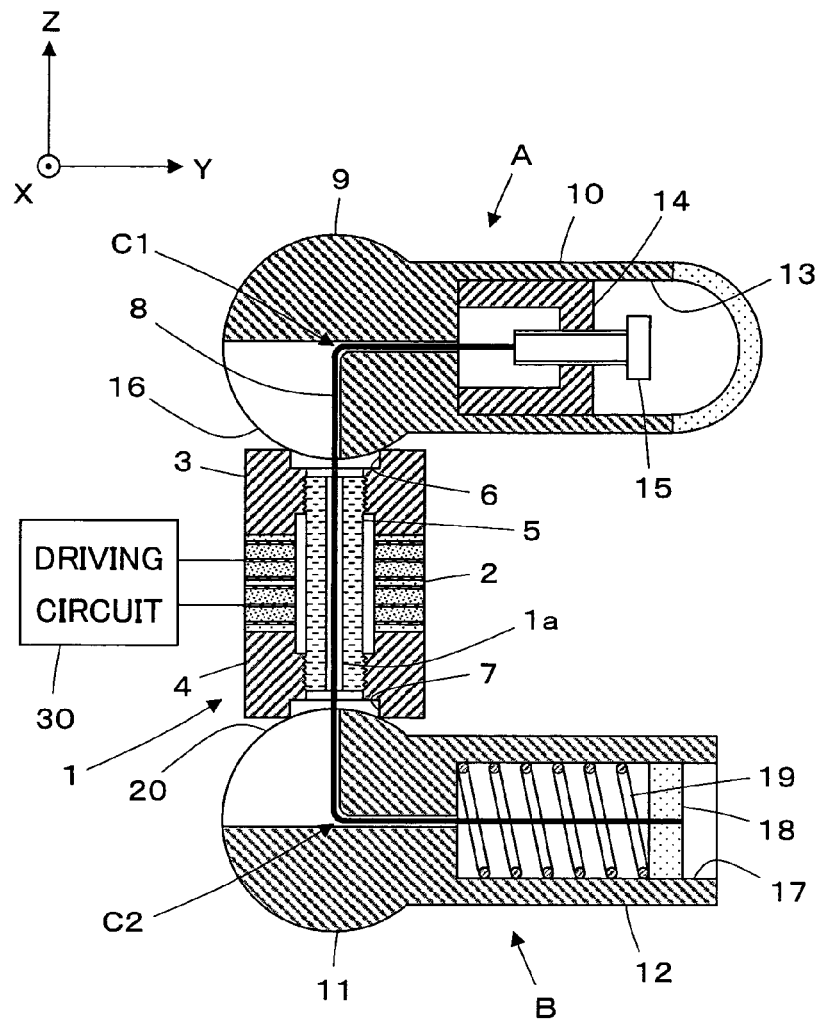
FIG. 1 is a sectional view showing a vibration actuator according to a first embodiment of the present invention.

FIG. 1 shows a vibration actuator according to a first embodiment of the present invention. The vibration actuator is an ultrasonic actuator in which a rotor is rotated by utilizing ultrasonic vibration. The vibration actuator includes an actuator main body 1 and two rotors A and B rotated by the actuator main body 1. The actuator main body 1 has a single cylindrical composite vibrator 2, and a first stator 3 and a second stator 4 arranged on both end portions of the composite vibrator 2, respectively. The first stator 3 and the second stator 4 sandwich the composite vibrator 2 therebetween and are connected to each other through a connection bolt 5 allowed to pass through the composite vibrator 2, thereby constituting the actuator main body 1 having a substantially column-like outer configuration. The actuator main body 1 is provided with a through hole 1a formed on a central axis thereof. Further, a driving circuit 30 for driving the composite vibrator 2 is connected to the composite vibrator 2.

Here, for convenience of description, it is assumed that a central axis of the actuator main body 1 extending from the second stator 4 to the first stator 3 is defined as a Z axis, an X axis extends perpendicularly to the Z axis, and a Y axis extends perpendicularly to both the Z axis and the X axis.

The first stator 3 and the second stator 4 are provided with recesses 6 and 7, respectively, formed on the opposite sides to surfaces thereof in contact with the composite vibrator 2. Opening end peripheral portions of the recesses 6 and 7 are formed with annular corner portions, respectively, positioned on XY planes. A first rotor A is arranged so as to be in contact with the corner portion of the first stator 3, and a second rotor B is arranged so as to be in contact with the corner portion of the second stator 4. In this state, the first rotor A and the second rotor B are connected to each other through a flexible wire member 8 caused to pass through the through hole 1a of the actuator main body 1.

The first rotor A has a spherical portion 9 including a spherical surface as a contact surface with respect to the first stator 3, the spherical surface having a diameter larger than an inner diameter of the recess 6 of the first stator 3. The first rotor A also has a cylindrical portion 10 formed integrally with the spherical portion 9. The spherical portion 9 abuts against the corner portion of the first stator 3 to be supported rotatably about a rotation center C1. Similarly, the second rotor B has a spherical portion 11 including a spherical surface as a contact surface with respect to the second stator 4, the spherical surface having a diameter larger than an inner diameter of the recess 7 of the second stator 4. The second rotor B also has a cylindrical portion 12 formed integrally with the spherical portion 11. The spherical portion 11 abuts against the corner portion of the second stator 4 to be supported rotatably about a rotation center C2.

A support member 14 is fixed to an inner surface of an accommodation recess 13 formed in the cylindrical portion 10 of the first rotor A, and an adjustment screw 15 is screwed into a screw hole (not shown) formed in the support member 14. The spherical portion 9 of the first rotor A is provided with a passage formation space 16 formed therein, the passage formation space 16 communicating with the accommodation recess 13 for allowing the wire member 8 to pass through the spherical portion 9.

Further, a spring receiving member 18 is accommodated in an accommodation recess 17 formed in the cylindrical portion 12 of the second rotor B so as to be slidable with respect to the accommodation recess 17, and a spring member 19 is accommodated between the spring receiving member 18 and a bottom surface of the accommodation recess 17. The spherical portion 11 of the second rotor B is also provided with a passage formation space 20 formed therein, the passage formation space 20 communicating with the accommodation recess 17 for allowing the wire member 8 to pass through the spherical portion 11.

One end portion of the wire member 8 is fixed to the adjustment screw 15 in the accommodation recess 13 of the first rotor A. The wire member 8 passes through the passage formation space 16 in the spherical portion 9 of the first rotor A, the through hole 1a of the actuator main body 1, and the passage formation space 20 in the spherical portion 11 of the second rotor B, the other end portion of the wire member 8 being fixed to the spring receiving member 18 in the accommodation recess 17 of the second rotor B. In this manner, the first rotor A and the second rotor B are connected to each other through the wire member 8.

In this case, the spring member 19 in the second rotor B biases the spring receiving member 18 in a direction opposite to the bottom surface of the accommodation recess 17, thereby allowing the other end portion of the wire member 8 to be pulled to generate a tension in the wire member 8. Owing to the tension, the two rotors A and B are attracted toward the corresponding stators 3 and 4 of the actuator main body 1 to be in contact with and pressurized against the stators 3 and 4, respectively.

Further, by rotating the adjustment screw 15 in the first rotor A to change a position of the adjustment screw 15 in axial direction thereof with respect to the support member 14, the spring member 19 is elongated or contracted through the wire member 8 and the spring receiving member 18, thereby making it possible to adjust a magnitude of the tension generated in the wire member 8. Note that, the adjustment screw 15 and the support member 14 constitute a tension adjusting means in the present invention.

Figure 2:
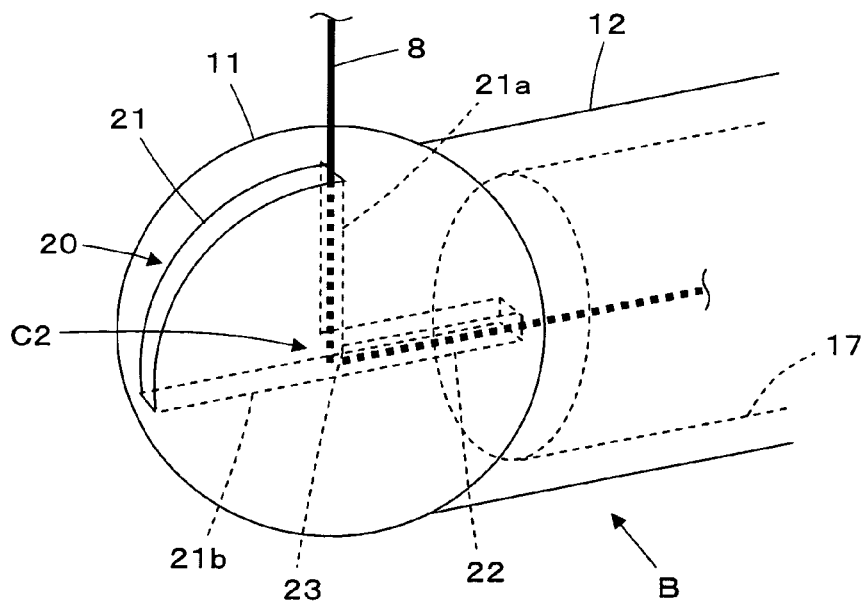
FIG. 2 is a partial perspective view showing a structure in the vicinity of a spherical portion of a rotor in the first embodiment.

As shown in FIG. 2, the passage formation space 20 formed in the spherical portion 11 of the second rotor B has a slit-like opening 21 formed so as to extend from a surface of the spherical portion 11 to the rotation center C2 thereof. The passage formation space 20 also has a communication passage 22 for communicating between the opening 21 and the accommodation recess 17 in the cylindrical portion 12. The opening 21 is formed so as to widen from the rotation center C2 toward the surface of the spherical portion 11 in a fan-like shape having a central angle of 90 degrees, and one end portion of the communication passage 22 communicates with the opening 21 in the vicinity of the rotation center C2. With respect to a pair of inner walls 21a and 21b positioned on both ends in a widening direction of the fan-like shape in the opening 21, the communication passage 22 extends not only in a direction perpendicular to the one inner wall 21a but also in the same direction as the other inner wall 21b, and the other end portion of the communication passage 22 communicates with the accommodation recess 17. In the vicinity of the rotation center C2, a boundary portion between the one inner wall 21a of the opening 21 and an inner wall of the communication passage 22 is provided with an engagement portion 23 which is angular at substantially 90 degrees.

The spherical portion 11 of the second rotor B is arranged so that at least a part of the opening 21 of the passage formation space 20 is opposed to the recess 7 of the second stator 4. The wire member 8 is arranged so as to pass through the communication passage 22 from the inside of the accommodation recess 17 of the second rotor B, contact with the engagement portion 23 to be deflected and pass through the opening 21 to reach the second stator 4.

Note that, as shown in FIG. 1, also in the spherical portion 9 of the first rotor A, there is formed the passage formation space 16 having a structure symmetrical with the passage formation space 20 of the second rotor B. The wire member 8 is arranged so as to pass through the communication passage of the passage formation space 16 from the inside of the accommodation recess 13 in the first rotor A, contact with an engagement portion positioned in the vicinity of the rotation center C1 to be deflected and pass through the opening to reach the first stator 3.

Figure 3:
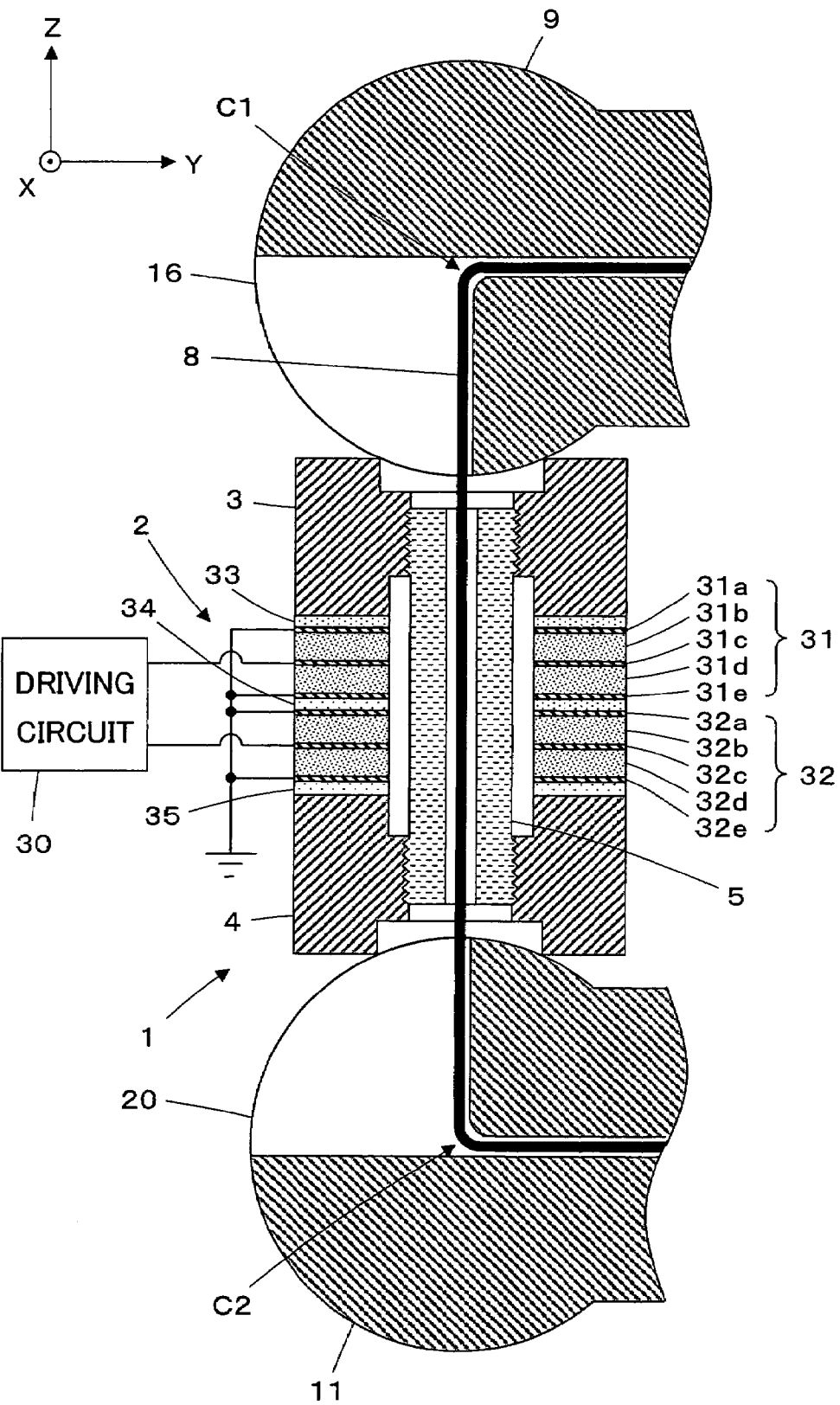
FIG. 3 is an enlarged partial sectional view showing a structure of a composite vibrator in the first embodiment.

As shown in FIG. 3, the composite vibrator 2 has a flat plate-like first piezoelectric element portion 31 and a flat plate-like second piezoelectric element portion 32 which are positioned on XY planes and are stacked on each other. The piezoelectric element portions 31 and 32 are arranged so as to be electrically insulated from the first stator 3 and the second stator 4, respectively, and from each other through intermediation of insulating sheets 33 to 35.

The first piezoelectric element portion 31 of the composite vibrator 2 has a structure in which an electrode plate 31a, a piezoelectric element plate 31b, an electrode plate 31c, a piezoelectric element plate 31d, and an electrode plate 31e each having a disc-like shape, are overlapped each other in the stated order. Similarly, the second piezoelectric element portion 32 has a structure in which an electrode plate 32a, a piezoelectric element plate 32b, an electrode plate 32c, a piezoelectric element plate 32d, and an electrode plate 32e each having a disc-like shape, are overlapped each other in the stated order.

The electrode plate 31a and the electrode plate 31e which are arranged on both surface sides of the first piezoelectric element portion 31, and the electrode plate 32a and the electrode plate 32e which are arranged on both surface sides of the second piezoelectric element portion 32 are electrically grounded, respectively. Further, a terminal led out from the electrode plate 31c arranged between the pair of piezoelectric element plates 31b and 31d of the first piezoelectric element portion 31 is connected to the driving circuit 36, and a terminal led out from the electrode plate 32c arranged between the pair of piezoelectric element plates 32b and 32d of the second piezoelectric element portion 32 is also connected to the driving circuit 30.

Figure 4:
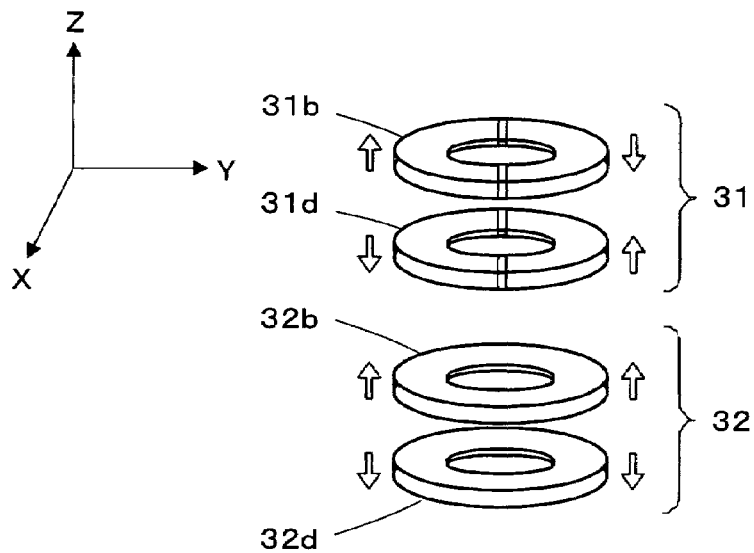
FIG. 4 is a perspective view showing a polarization direction of two pairs of piezoelectric element plates of the composite vibrator used in the first embodiment.

As shown in FIG. 4, each of piezoelectric element plates 31b and 31d of the first piezoelectric element portion 31 is divided into two portions in the Y-axis direction and is polarized so that the two portions thereof have opposite polarities to exhibit opposite deformation behaviors to each other, that is, expansion and contraction in the Z-axis direction (thickness direction). The piezoelectric element plate 31b and the piezoelectric element plate 31d are arranged in reverse orientations to each other.

Each of piezoelectric element plates 32b and 32d of the second piezoelectric element portion 32 is not divided into two portions and is polarized such that each plate 32b and 32d as a whole exhibits a deformation behavior, that is, expansion or contraction in the Z-axis direction (thickness direction). The piezoelectric element plate 32b and the piezoelectric element plate 32d are arranged in reverse orientations to each other.

Figure 5:
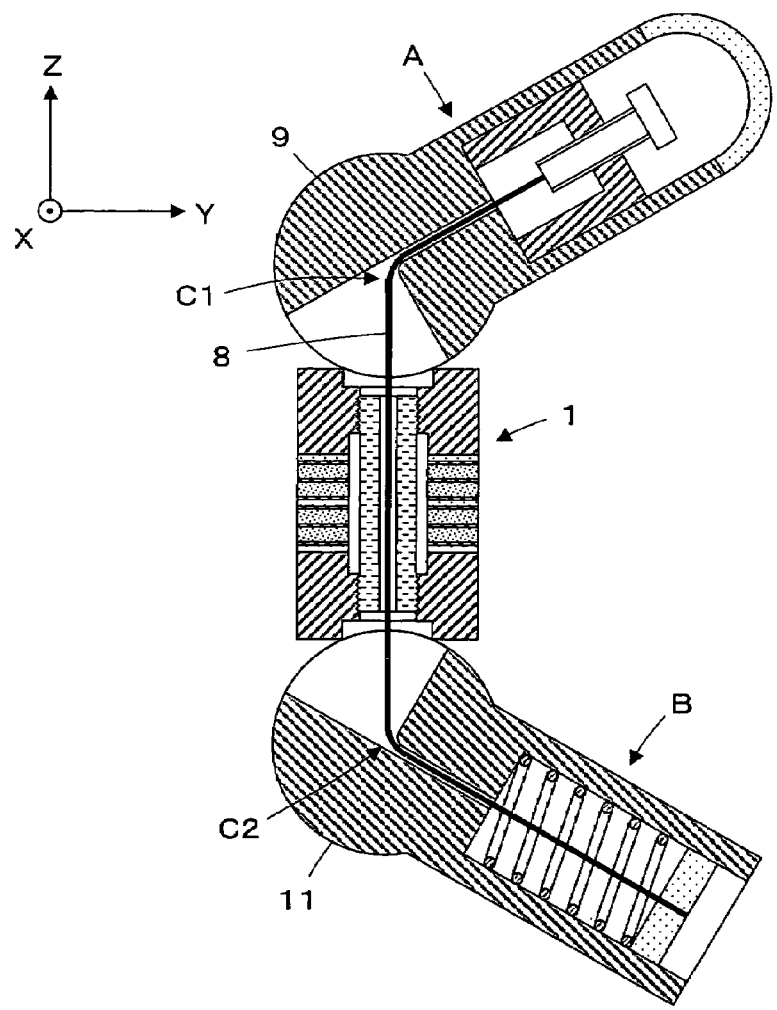
FIG. 5 is a sectional view showing an operational state of the vibration actuator according to the first embodiment of the present invention.
Figure 6:
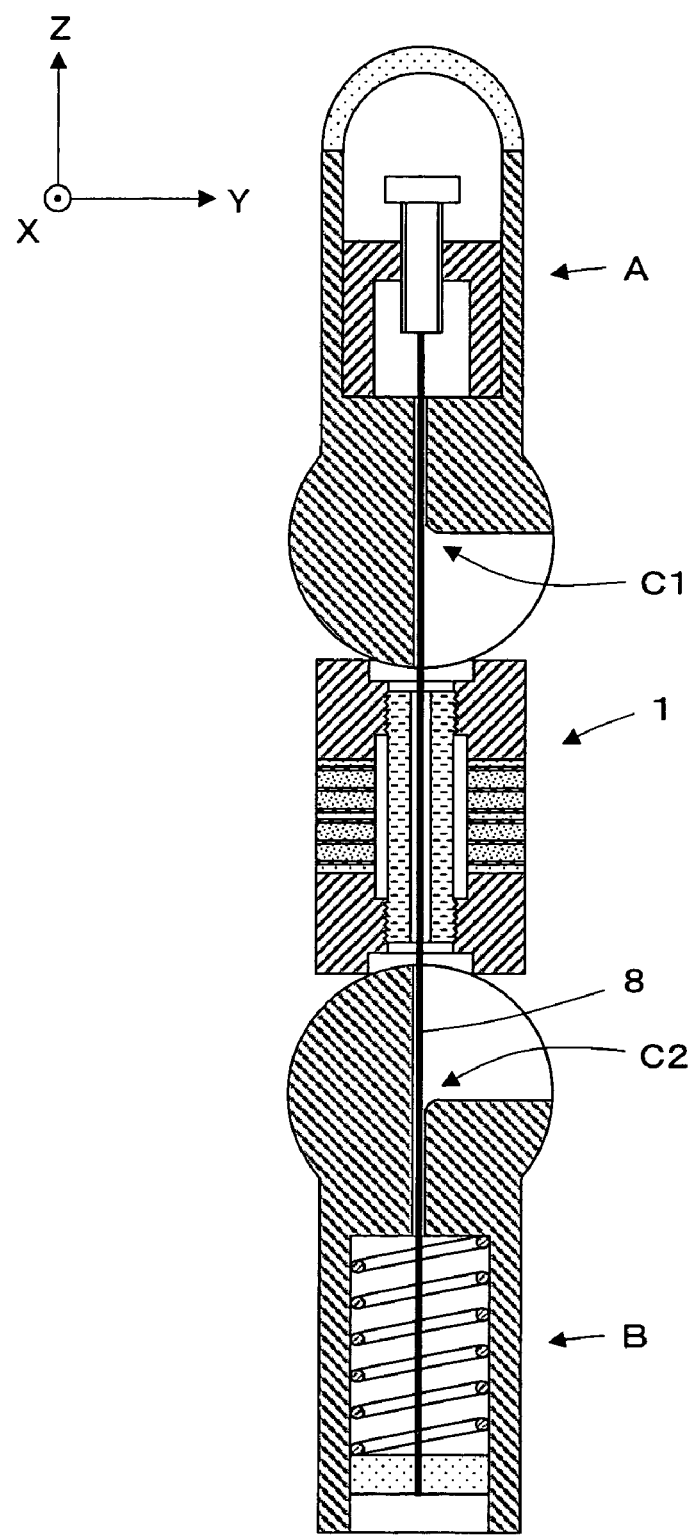
FIG. 6 is a sectional view showing another operational state of the vibration actuator according to the first embodiment of the present invention.

Next, a description will be made of an operation of the vibration actuator according to the first embodiment of the present invention. By applying the alternating current voltages having phases shifted by 90 degrees with respect to each other from the driving circuit 30 to the electrode plate 31c of the first piezoelectric element portion 31 and the electrode plate 32c of the second piezoelectric element portion 32, a composite vibration combining the flexural vibration in the Y-axis direction and the longitudinal vibration in the Z-axis direction is generated by the composite vibrator 2. In this case, in the corner portion of the first stator 3 and the corner portion of the second stator 4, elliptical movements are caused in a YZ plane. Accordingly, as shown in FIGS. 5 and 6, the first rotor A abutting onto and pressurized against the corner portion of the first stator 3 and the second rotor B abutting onto and pressurized against the corner portion of the second stator 4 are rotated at the same time about the X axis around the rotation centers C1 and C2, respectively.

As described above, by generating the composite vibration with the single composite vibrator 2 to thereby cause the elliptical movements in contact portions of the pair of the stators 3 and 4 abutting to the corresponding rotors A and B, respectively, the two rotors A and B can be rotated at the same time. Accordingly, by employing the vibration actuator of the present invention, a joint mechanism or the like having a plurality of joint portions to be rotated can be realized with a simple structure, thereby making it possible to achieve reduction in size and weight.

Further, since the two rotors A and B are attracted by the common single wire member 8 toward the corresponding stators 3 and 4, uniform preloads can be applied to the two rotors A and B to thereby make the two rotors A and B contacted with and pressurized against the corresponding stators 3 and 4, respectively.

Further, the wire member 8 has flexibility and is deflected by contacting with the engagement portion at the rotation center C1 of the first rotor A and the engagement portion 23 at the rotation center C2 of the second rotor B. Therefore, regardless of rotation angles of the two rotors A and B, the wire member 8 always passes through the rotation centers C1 and C2 of the two rotors A and B, respectively, and the wire member 8 does not move along a lengthwise direction thereof. As a result, a position of the spring receiving member 18 in a slide direction with respect to the accommodation recess 17 does not move, and an overall length of the spring member 19 is always maintained constant, thereby generating a constant tension in the wire member 8. Thus, the preload applied to each rotor A and B can be made constant regardless of the rotation of the rotor.

As a result, torques caused in the rotors A and B by the corresponding stators 3 and 4 of the actuator main body 1, respectively, can be maintained constant, and each of the two rotors A and B can be rotated smoothly and in a stable manner.

Further, the wire member 8 passes through the inside of the actuator main body 1 and the rotors A and B, respectively, and the spring member 19 is accommodated in the second rotor B, so that a small vibration actuator is realized.

Further, by operating the adjustment screw 15 in the first rotor A, a magnitude of the tension generated in the wire member 8 can be adjusted, therefore the preloads applied to the two rotors A and B can be easily adjusted.

Since the vibration actuator is an ultrasonic actuator employing ultrasonic vibration, the vibration actuator has high torque performance and can be driven without using a gear.

Further, when wirings for connecting the piezoelectric element portions 31 and 32 to the driving circuit 30, and the like are accommodated in the inside of the actuator main body 1 and the rotors A and B, the vibration actuator as a whole can be downsized.

Second Embodiment

Next, with reference to FIG. 7, a vibration actuator according to a second embodiment of the present invention will be described. Compared to the first embodiment, in the second embodiment, the passage formation spaces 16 and 20 formed in the spherical portions 9 and 11 of the rotors A and B have semicircular openings 51 and 52, respectively, instead of the fan-shaped openings.

Figure 8:
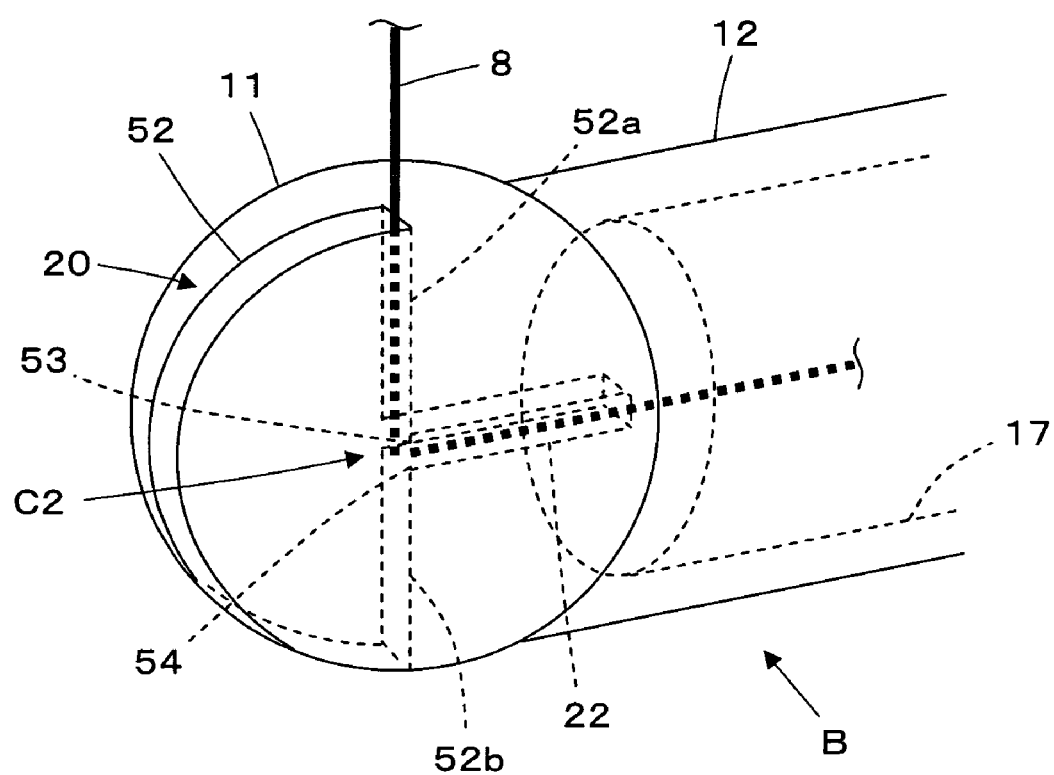
FIG. 8 is a partial perspective view showing a structure in the vicinity of a spherical portion of a rotor in the second embodiment.

As shown in FIG. 8, the opening 52 in the spherical portion 11 of the second rotor B is formed in a slit-like shape so as to extend from the surface of the spherical portion 11 to the rotation center C2 and has a semicircular shape around the rotation center C2. One end portion of the communication passage 22 communicates with the opening 52 in the vicinity of the rotation center C2. The communication passage 22 extends in a direction perpendicular to both a pair of inner walls 52a and 52b which are positioned in a diameter portion of the semicircular shape of the opening 52, and the other end portion of the communication passage 22 communicates with the accommodation recess 17. In the vicinity of the rotation center C2, boundary portions between the pair of the inner walls 52a and 52b of the opening 52 and the inner walls of the communication passage 22 are provided with engagement portions 53 and 54, respectively, each of which is angular at substantially 90 degrees.

The spherical portion 11 of the second rotor B is arranged so that at least a part of the opening 52 is opposed to the recess 7 of the second stator 4. The wire member 8 is arranged so as to pass through the communication passage 22 from the inside of the accommodation recess 17 of the second rotor B, contact with one of the two engagement portions 53 and 54 to be deflected and pass through the opening 52 to reach the second stator 4.

Figure 7:
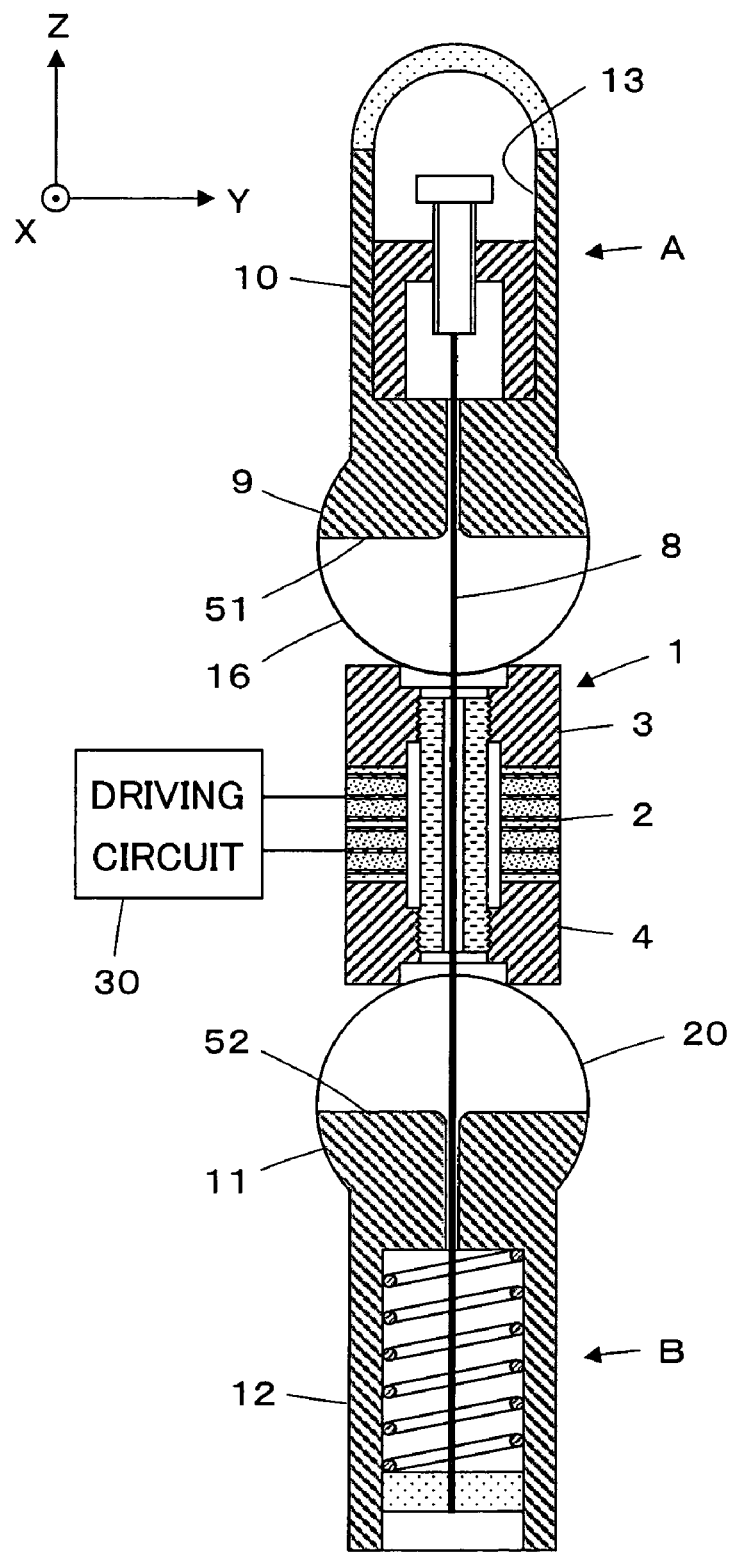
FIG. 7 is a sectional view showing a vibration actuator according to a second embodiment of the present invention.

Note that, as shown in FIG. 7, also in the spherical portion 9 of the first rotor A, there is formed the passage formation space 16 having a structure symmetrical with the passage formation space 20 of the second rotor B. The wire member 8 is arranged so as to pass through the communication passage of the passage formation space 16 from the inside of the accommodation recess 13 in the first rotor A, contact with one of two engagement portions positioned in the vicinity of the rotation center C1 to be deflected and pass through the opening 51 to reach the first stator 3.

Figure 9A:
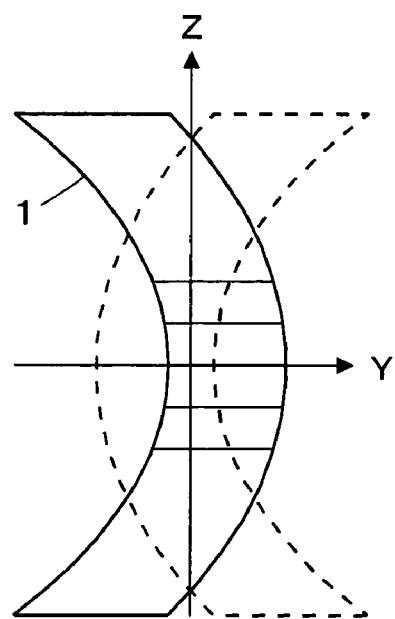
FIG. 9a is a view showing a state where the actuator main body vibrates in a primary mode of a flexural vibration in a Y-axis direction.
Figure 9B:
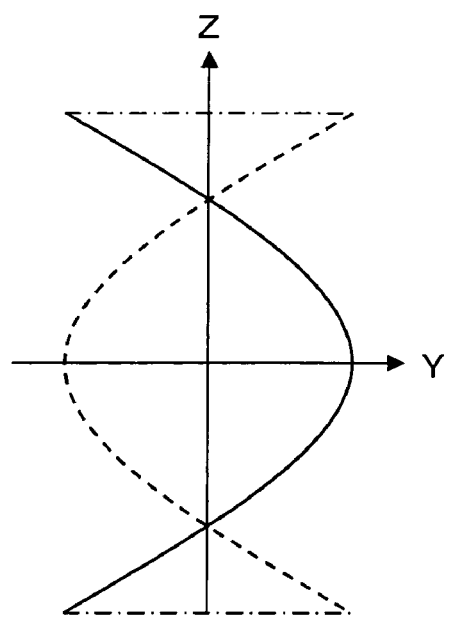

In this case, when an alternating current voltage is applied to the electrode plate 31c of the first piezoelectric element portion 31 by the driving circuit 30 to generate in the first piezoelectric element portion 31 the flexural vibration of the primary mode in the Y-axis direction, the two portions mutually divided of each piezoelectric element plate 31b and 31d of the first piezoelectric element portion 31 alternately repeat expansion and contraction in the Z-axis direction, therefore the actuator main body 1 vibrates as shown in FIG. 9a. Here, displacement in the Y-axis direction of each portion of the actuator main body 1 of FIG. 9a is shown in FIG. 9b. With reference to FIG. 9b, it is understood that both end portions of the actuator main body 1, that is, the corner portion of the first stator 3 and the corner portion of the second stator 4 vibrate in the same phase.

Figure 10A:
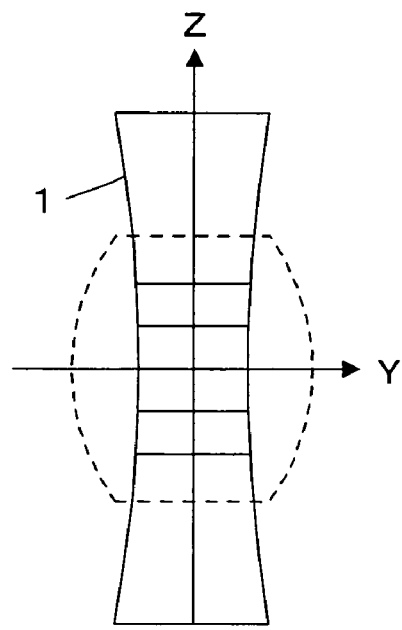
FIG. 10a is a view showing a state where the actuator main body vibrates in a primary mode of a longitudinal vibration in a Z-axis direction.
Figure 10B:
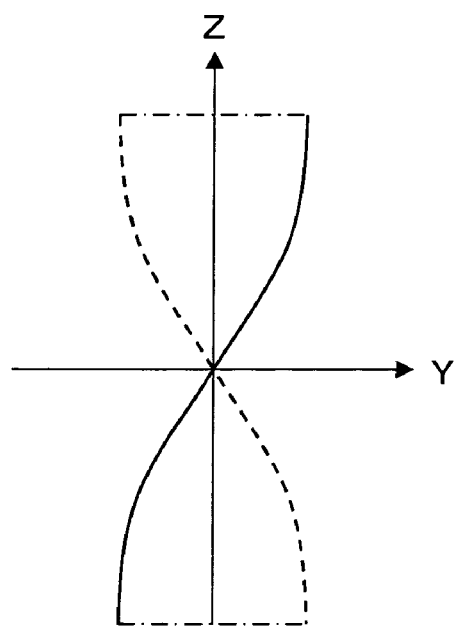
FIG. 10b is a view showing displacement in the Z-axis direction of each portion of the actuator main body shown in FIG. 10a with the displacement being converted into that in the Y-axis direction.

Further, when an alternating current voltage is applied to the electrode plate 32c of the second piezoelectric element portion 32 by the driving circuit 30 to generate in the second piezoelectric element portion 32 the longitudinal vibration of the primary mode in the Z-axis direction, both of piezoelectric element plates 32b and 32d of the second piezoelectric element portion 32 alternately repeat expansion and contraction in the Z-axis direction, therefore the actuator main body 1 vibrates as shown in FIG. 10a. Here, displacement in the Z-axis direction of each portion of the actuator main body 1 of FIG. 10a is shown in FIG. 10b with the displacement in the Z-axis direction converted into that in the Y-axis direction. With reference to FIG. 10b, it is understood that both end portions of the actuator main body 1, that is, the corner portion of the first stator 3 and the corner portion of the second stator 4 vibrate in the opposite phases with respect to each other.

Figure 11:
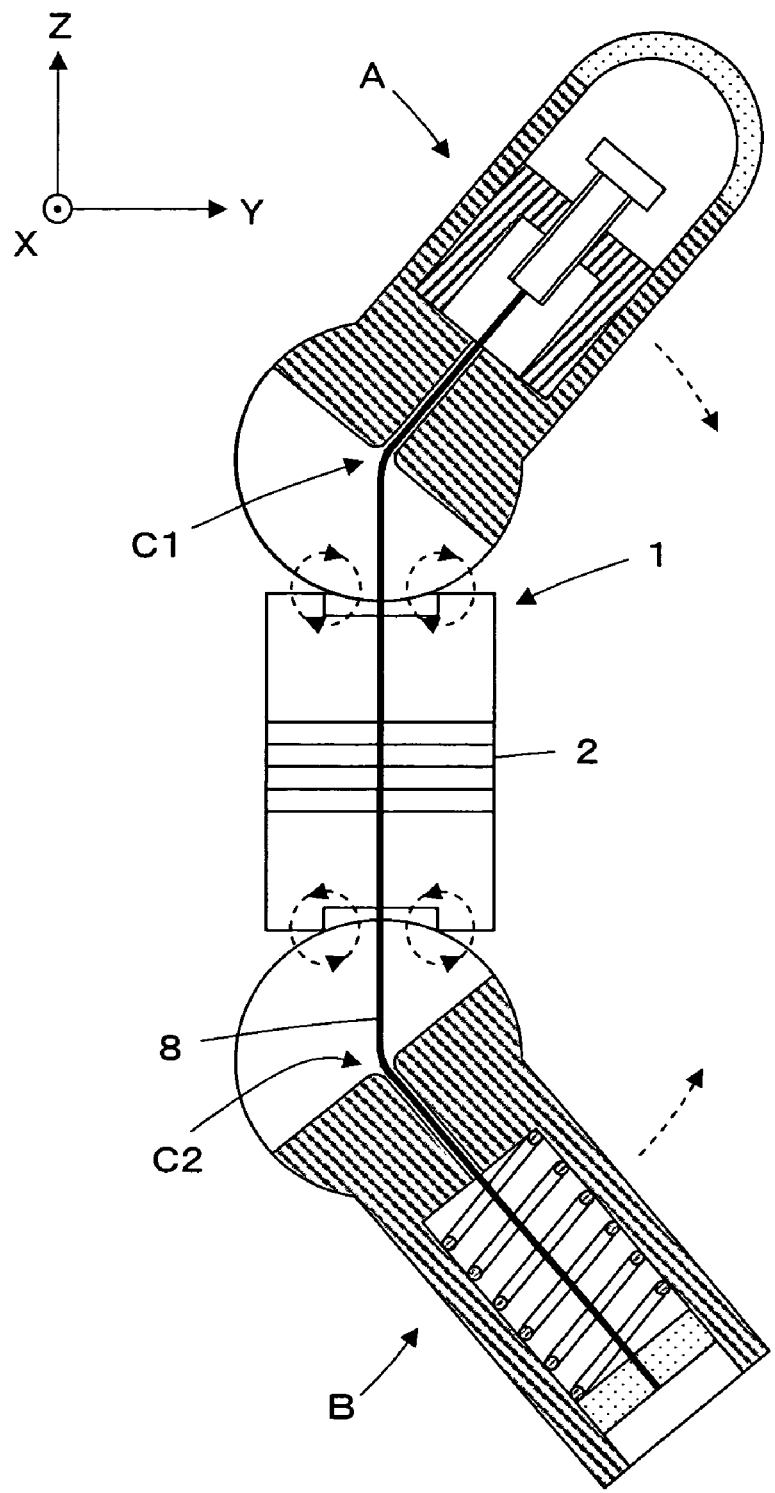
FIG. 11 is a view showing a state where two rotors in the second embodiment are rotated in directions opposite to each other.

Now, by applying the alternating current voltages having phases shifted by 90 degrees with respect to each other to the electrode plate 31c of the first piezoelectric element portion 31 and the electrode plate 32c of the second piezoelectric element portion 32, a composite vibration combining the flexural vibration of the primary mode in the Y-axis direction and the longitudinal vibration of the primary mode in the Z-axis direction is generated by the composite vibrator 2. In this case, the corner portion of the first stator 3 and the corner portion of the second stator 4 are displaced in the same phase in the Y-axis direction due to the flexural vibration of the primary mode in the Y-axis direction, and are displaced in opposite phases with respect to each other in the Z-axis direction due to the longitudinal vibration of the primary mode in the Z-axis direction. Thus, as shown in FIG. 11, in the corner portion of the first stator 3 and the corner portion of the second stator 4, elliptical movements in opposite directions with respect to each other are caused in a YZ plane. Accordingly, the first rotor A abutting onto and pressurized against the corner portion of the first stator 3 and the second rotor B abutting onto and pressurized against the corner portion of the second stator 4 are rotated in the opposite directions with respect to each other at the same time about the X axis with the rotation centers C1 and C2 thereof serving as centers, respectively.

Figure 12:
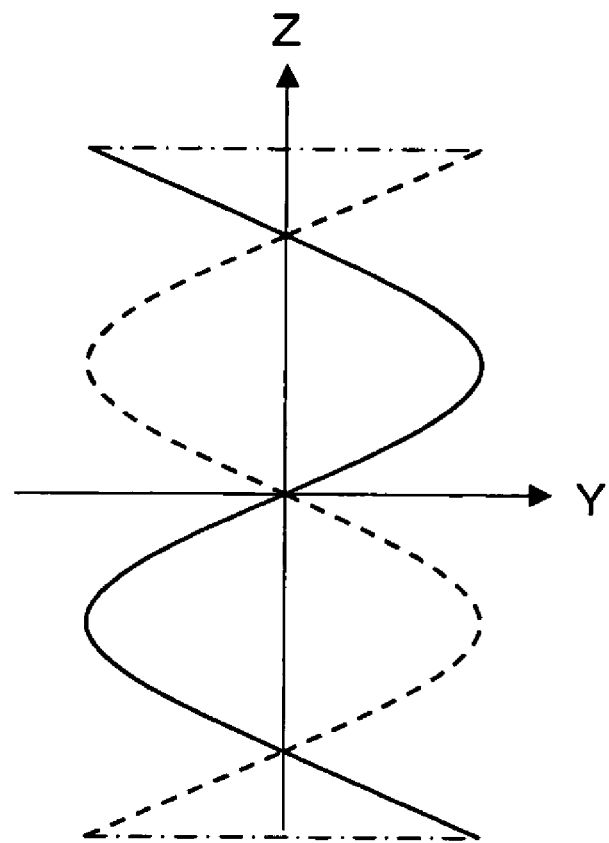
FIG. 12 is a view showing displacement in the Y-axis direction of each portion of the actuator main body vibrating in a secondary mode of a flexural vibration in the Y-axis direction.

Further, FIG. 12 shows the displacement in the Y-axis direction of each portion of the actuator main body 1 in a case where the flexural vibration of the secondary mode in the Y-axis direction is caused in the first piezoelectric element portion 31. With reference to FIG. 12, it is understood that the both end portions of the actuator main body 1, that is, the corner portion of the first stator 3 and the corner portion of the second stator 4 vibrate in the opposite phases with respect to each other.

Figure 13:
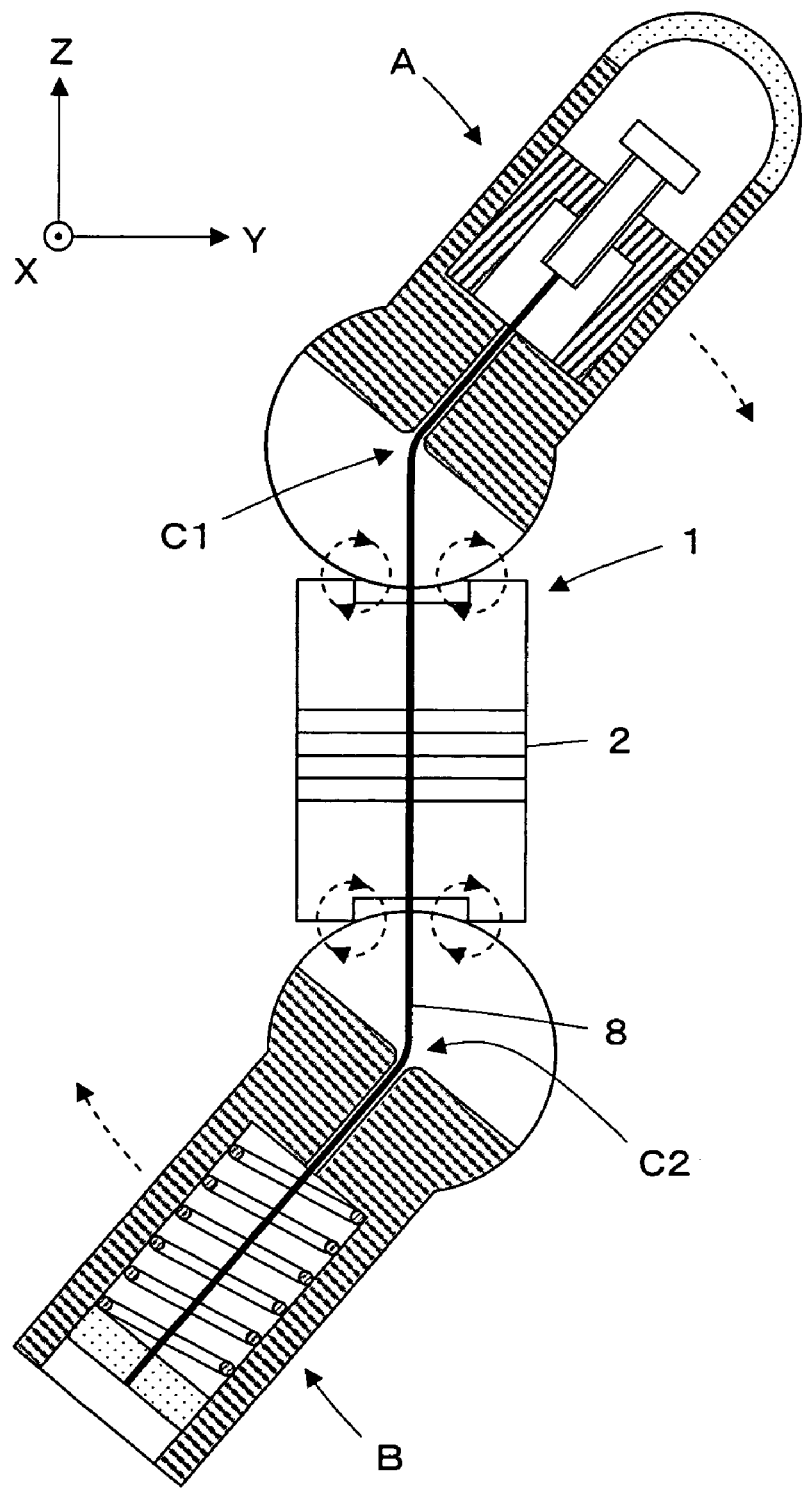
FIG. 13 is a view showing a state where the two rotors in the second embodiment are rotated in the same direction.

Now, by applying the alternating current voltages having phases shifted by 90 degrees with respect to each other to the electrode plate 31c of the first piezoelectric element portion 31 and the electrode plate 32c of the second piezoelectric element portion 32, a composite vibration combining the flexural vibration of the secondary mode in the Y-axis direction and the longitudinal vibration of the primary mode in the Z-axis direction is generated by the composite vibrator 2. In this case, the corner portion of the first stator 3 and the corner portion of the second stator 4 are displaced in the opposite phases with respect to each other in the Y-axis direction due to the flexural vibration of the secondary mode in the Y-axis direction, and are displaced in opposite phases with respect to each other in the Z-axis direction due to the longitudinal vibration of the primary mode in the Z-axis direction. Thus, as shown in FIG. 13, in the corner portion of the first stator 3 and the corner portion of the second stator 4, elliptical movements in the same direction are caused in the YZ plane. Accordingly, the first rotor A abutting onto and pressurized against the corner portion of the first stator 3 and the second rotor B abutting onto and pressurized against the corner portion of the second stator 4 are rotated in the same direction at the same time about the X axis with the rotation centers C1 and C2 thereof serving as centers, respectively.

Accordingly, similarly to the first embodiment of the present invention, by generating the composite vibration with the single composite vibrator 2 to thereby cause the elliptical movements in contact portions of the stators 3 and 4 abutting to the corresponding rotors A and B, respectively, the two rotors A and B can be rotated at the same time.

Further, as described above, by selecting a combination of a vibration mode of the longitudinal vibration in the Z-axis direction and a vibration mode of the flexural vibration in the Y-axis direction, the first rotor A and the second rotor B can be rotated in the same direction or in the opposite directions with respect to each other.

Figure 14:
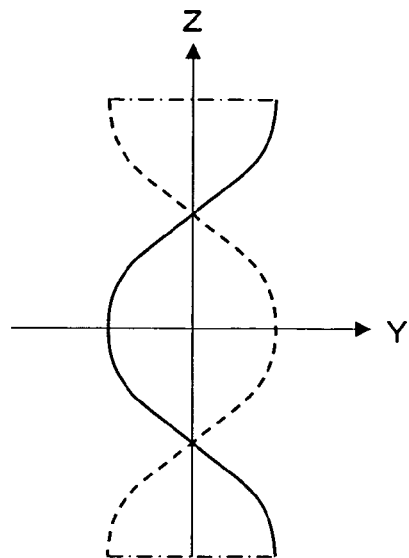
FIG. 14 is a view showing displacement in the Z-axis direction of each portion of the actuator main body vibrating in a secondary mode of a longitudinal vibration in the Z-axis direction with the displacement converted into that in the Y-axis direction.

Note that, FIG. 14 shows the displacement in the Z-axis direction of each portion of the actuator main body 1 in a case where the longitudinal vibration of the secondary mode in the Z-axis direction is caused in the second piezoelectric element portion 32 with the displacement in the Z-axis direction converted into that in the Y-axis direction. With reference to FIG. 14, it is understood that the both end portions of the actuator main body 1, that is, the corner portion of the first stator 3 and the corner portion of the second stator 4 vibrate in the same phase.

Accordingly, when the composite vibration combining the flexural vibration of the primary mode in the Y-axis direction and the longitudinal vibration of the secondary mode in the Z-axis direction is generated, similarly to the case where the composite vibration combining the flexural vibration of the secondary mode in the Y-axis direction and the longitudinal vibration of the primary mode in the Z-axis direction is generated, the two rotors A and B can be rotated in the same direction about the X axis.

Note that, in the first piezoelectric element portion 31 and the second piezoelectric element portion 32, the vibration mode of each of the flexural vibration in the Y-axis direction and the longitudinal vibration in the Z-axis direction can be set not only to the primary mode or the secondary mode as described above, but also to a tertiary or higher mode. For example, it is possible to employ a vibration mode of a degree suitable to shapes, materials and the like of the rotors A and B and the stators 3 and 4.

Third Embodiment

Figure 15:
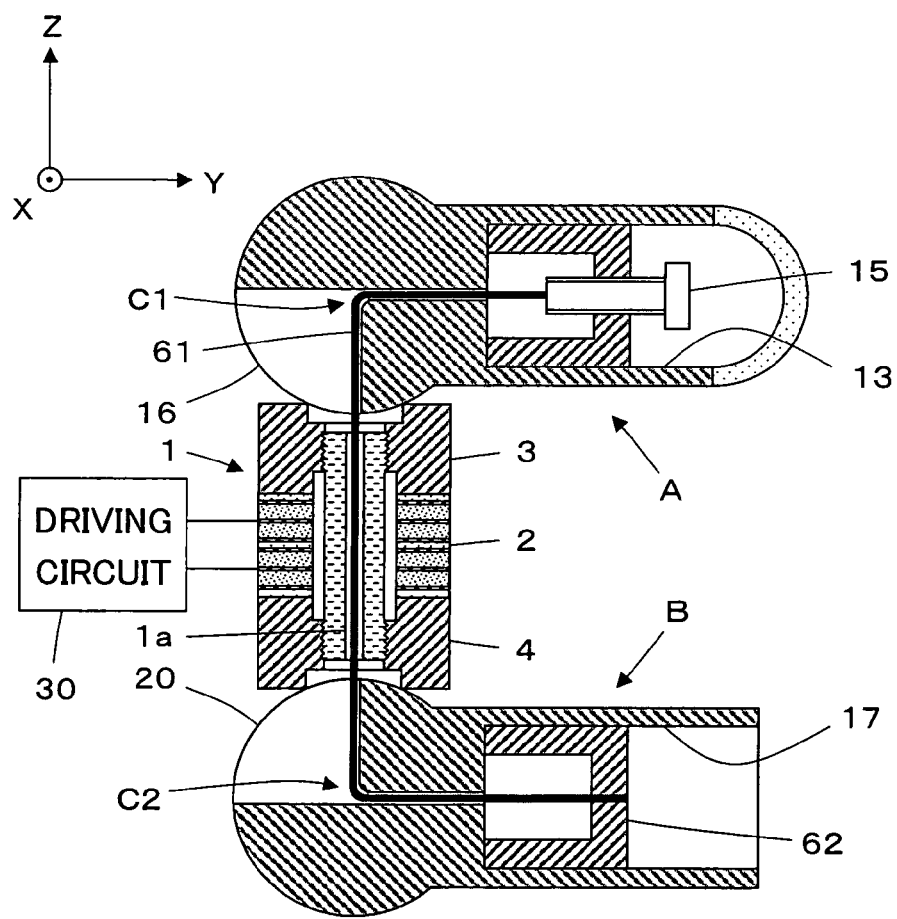
FIG. 15 is a sectional view showing a vibration actuator according to a third embodiment of the present invention.

Next, with reference to FIG. 15, a description will be made of a vibration actuator according to a third embodiment of the present invention. Compared to the first embodiment, in the third embodiment, a thread-like rubber member 61 having elasticity is used as a preload means for the rotor A and B, instead of using the wire member 8 and the spring member 19. In this case, a support member 62 is fixed to the inner surface of the accommodation recess 17 in the second rotor B. One end portion of the rubber member 61 is fixed to the adjustment screw 15 in the accommodation recess 13 of the first rotor A. The rubber member 61 passes through the passage formation space 16 of the first rotor A, the through hole 1a of the actuator main body 1, and the passage formation space 20 of the second rotor B, the other end portion of the rubber member 61 being fixed to the support member 62 in the accommodation recess 17 of the second rotor B. In this manner, the two rotors A and B are connected to each other through the rubber member 61. Note that, the rubber member 61 is mounted in a state of being stretched to a length at which a predetermined tension is caused.

Through the tension of the rubber member 61, the two rotors A and B are attracted toward the corresponding stators 3 and 4 of the actuator main body 1, respectively, to be in contact with and pressurized against the stators 3 and 4. Accordingly, similarly with the first embodiment of the present invention, it is possible to rotate the two rotors A and B by the single composite vibrator 2.

Since the two rotors A and B are attracted by the single rubber member 61, uniform preloads can be applied to the two rotors A and B. Further, the rubber member 61 always passes through the rotation centers C1 and C2, respectively, and a position of the rubber member 61 along a lengthwise direction thereof does not move. Thus, the preload applied to each rotor A and B can be made constant regardless of the rotation thereof.

Further, by operating the adjustment screw 15 in the first rotor A, a magnitude of the tension of the rubber member 61 can be adjusted, therefore the magnitude of the preloads applied to the two rotors A and B can be easily adjusted.

Note that, also in the vibration actuator according to the second embodiment of the present invention, the rotors A and B can be contacted with and pressurized against the corresponding stators 3 and 4, respectively, by using the rubber member 61 instead of the wire member 8 and the spring member 19.

Fourth Embodiment

Figure 16:
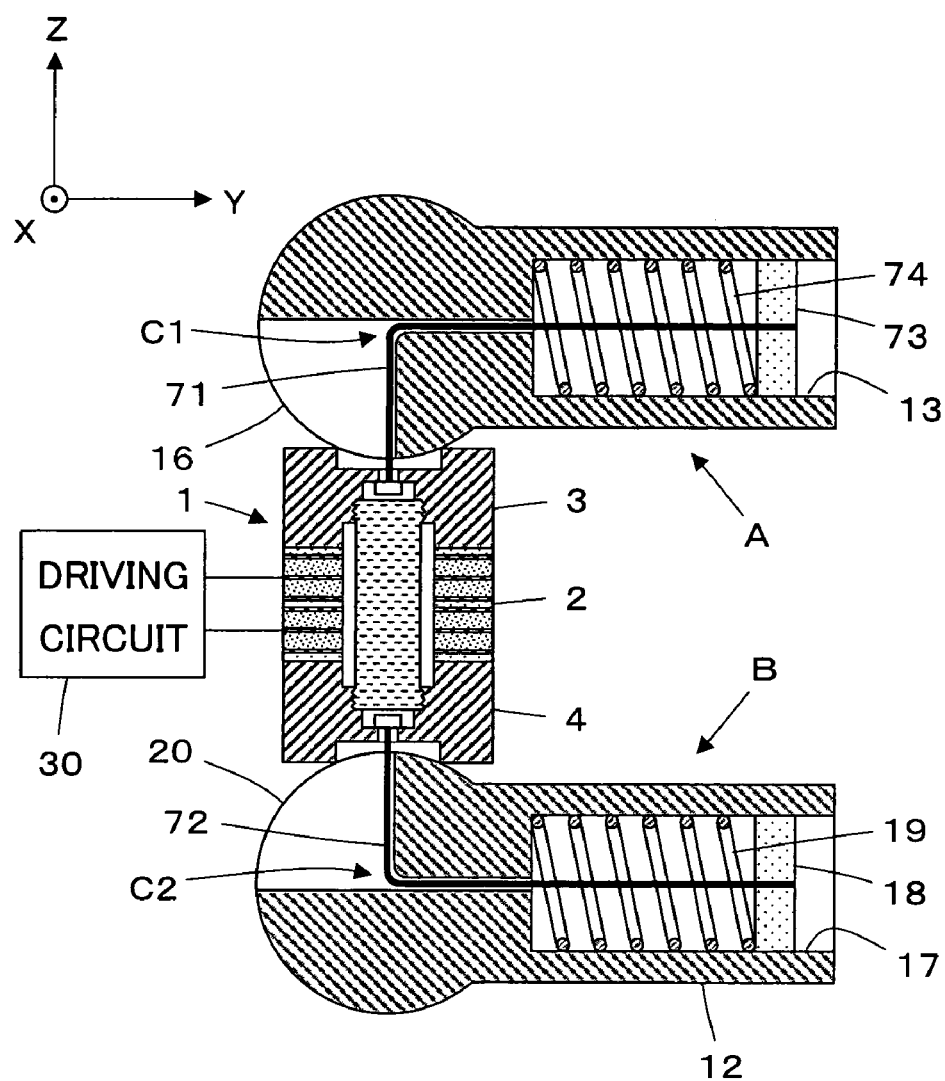
FIG. 16 is a sectional view showing a vibration actuator according to a fourth embodiment of the present invention.

Next, with reference to FIG. 16, a description will be made of a vibration actuator according to a fourth embodiment of the present invention. Compared to the first embodiment, in the fourth embodiment, two wire members 71 and 72 corresponding to the two rotors A and B, respectively, are used, instead of the single wire member 8. In this case, similarly to the inside of the accommodation recess 17 of the second rotor B, on the inside of the accommodation recess 13 of the first rotor A, a spring receiving member 73 is accommodated so as to be slidable with respect to the accommodation recess 13, and a spring member 74 is accommodated between the spring receiving member 73 and a bottom surface of the accommodation recess 13.

One end portion of the first wire member 71 is fixed to the spring receiving member 73 in the accommodation recess 13 of the first rotor A. The first wire member 71 passes through the passage formation space 16 of the first rotor A, the other end portion of the first wire member 71 being fixed to the first stator 3. The first rotor A is contacted with and pressurized against the first stator 3 due to a tension generated in the first wire member 71 by the spring member 74. One end portion of the second wire member 72 is fixed to the spring receiving member 18 in the accommodation recess 17 of the second rotor B. The second wire member 72 passes through the passage formation space 20 of the second rotor B, the other end portion of the second wire member 72 being fixed to the second stator 4. The second rotor B is contacted with and pressurized against the second stator 4 due to a tension generated in the second wire member 72 by the spring member 19.

In this manner, the two rotors A and B are contacted with and pressurized against the corresponding stators 3 and 4, respectively. Accordingly, similarly to the first embodiment of the present invention, it is possible to rotate the two rotors A and B by the single composite vibrator 2.

Further, in the fourth embodiment, the two rotors A and B are attracted toward the stators 3 and 4 by the two corresponding wire members 71 and 72, respectively. Therefore, preloads applied to the two rotors A and B can be set independently of each other. Accordingly, rotation torques generated in the two rotors A and B can be separately adjusted.

Also in a case where the two wire members 71 and 72 are thus used, the two wire members 71 and 72 always pass through the rotation centers C1 and C2 of the corresponding rotors A and B, respectively, and positions of the wire members 71 and 72 along the lengthwise direction thereof do not move. Therefore, the preload applied to each of the rotors A and B can be made constant regardless of the rotation thereof.

Note that, by using two thread-like rubber members having elasticity, the rotors A and B may be connected to the corresponding stators 3 and 4, respectively, thereby making the two rotors A and B contacted with and pressurized against the stators 3 and 4, instead of using the wire members 71 and 72 and the spring members 19 and 74.

Also in the vibration actuator according to the second embodiment of the present invention, by using the two wire members 71 and 72, the two rotors A and B may be connected to the corresponding stators 3 and 4, respectively, thereby making the rotors A and B contacted with and pressurized against the stators 3 and 4 through the tension of the wire members 71 and 72, instead of using the single wire member 8.

Note that, in the composite vibrator 2 according to the above first to fourth embodiments, there are used the first piezoelectric element portion 31 generating the flexural vibration in the Y-axis direction and the second piezoelectric element portion 32 generating the longitudinal vibration in the Z-axis direction. However, instead of the first piezoelectric element portion 31 or of the second piezoelectric element portion 32, a piezoelectric element portion generating the flexural vibration in the X-axis direction may be used. That is, by generating a composite vibration combining the flexural vibration in the X-axis direction and the longitudinal vibration in the Z-axis direction, or by generating a composite vibration combining the flexural vibration in the X-axis direction and the flexural vibration in the Y-axis direction, it is possible to rotate the two rotors A and B at the same time about the Y axis or the Z axis.

Fifth Embodiment

Figure 17:
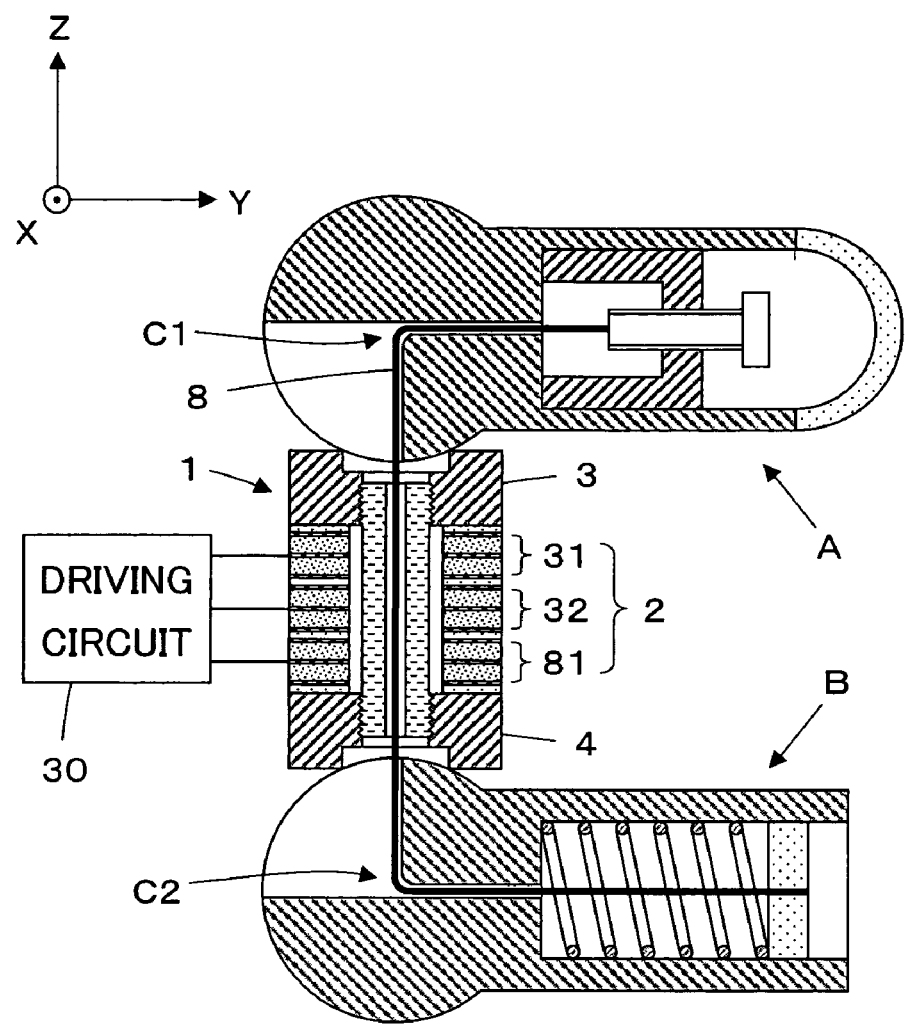
FIG. 17 is a sectional view showing a vibration actuator according to a fifth embodiment of the present invention.
Figure 18:
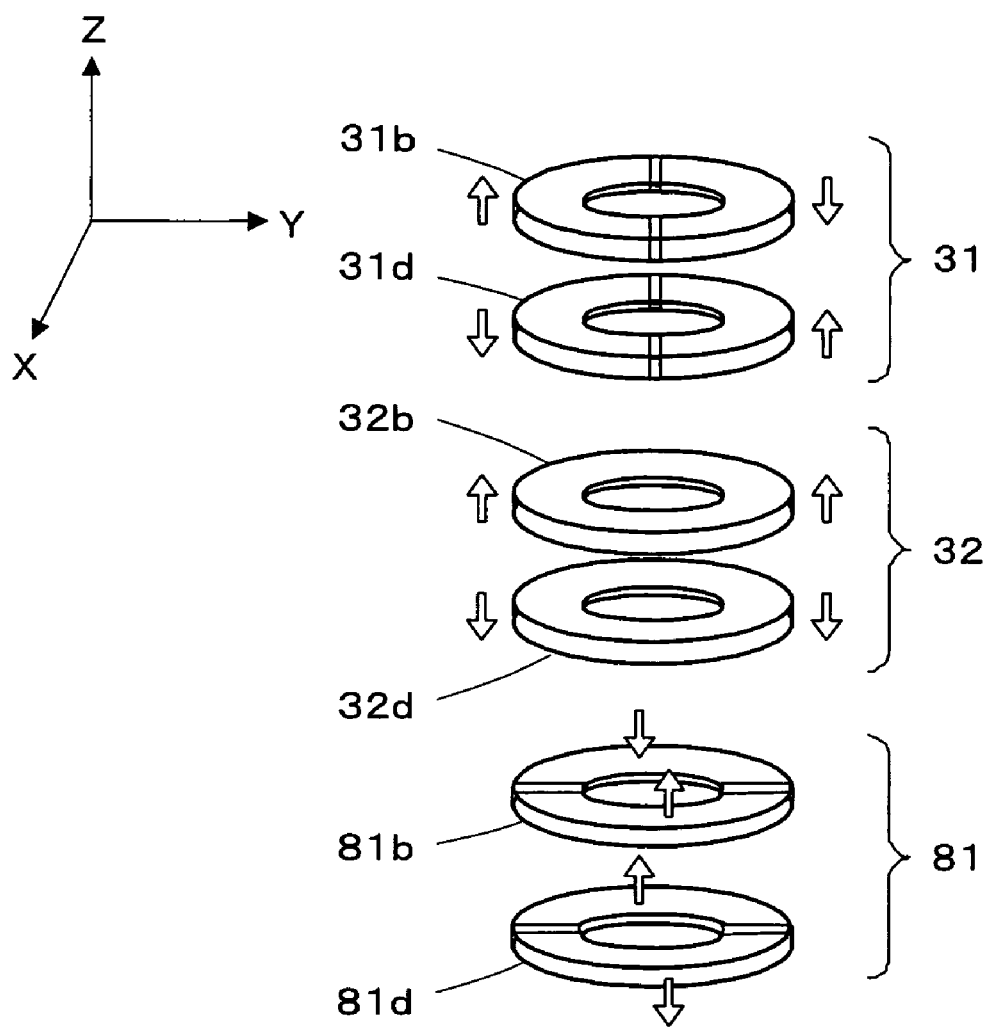
FIG. 18 is a perspective view showing a polarization direction of three pairs of piezoelectric element plates of a composite vibrator used in the fifth embodiment.

Next, with reference to FIG. 17, a description will be made of a vibration actuator according to a fifth embodiment of the present invention. Compared to the first embodiment, in the fifth embodiment, the composite vibrator 2 has a third piezoelectric element portion 81 generating the flexural vibration in the X-axis direction in addition to the first piezoelectric element portion 31 generating the flexural vibration in the Y-axis direction and the second piezoelectric element portion 32 generating the longitudinal vibration in the Z-axis direction. The third piezoelectric element portion 81 has a pair of piezoelectric element plates 81*b* and 81*d* as shown in FIG. 18. Each of piezoelectric element plates 81*b* and 81*d* is divided into two portions in the X-axis direction and is polarized so that the two portions thereof have opposite polarities to exhibit opposite deformation behaviors to each other, that is, expansion and contraction in the Z-axis direction (thickness direction). The piezoelectric element plate 81*b* and the piezoelectric element plate 81*d* are arranged in reverse orientations to each other. Note that, the third piezoelectric element portion 81 has the same structure as that of the first piezoelectric element portion 31 or the second piezoelectric element portion 32 except for the pair of piezoelectric element plates 81*b* and 81*d*.

By driving the composite vibrator 2 with the driving circuit 30 to generate a composite vibration combining at least two or all three vibrations of the flexural vibration in the Y-axis direction by the first piezoelectric element portion 31, the longitudinal vibration in the Z-axis direction by the second piezoelectric element portion 32, and the flexural vibration in the X-axis direction by the third piezoelectric element portion 81, the elliptical movements are caused in the corner portion of the first stator 3 and the corner portion of the second stator 4, respectively. Thus, the first rotor A and the second rotor B can be freely rotated on three dimensions at the same time.

Further, also in this case, the two rotors A and B can be rotated in the same direction or the opposite directions with respect to each other, by selecting the combination of the vibration mode.

Note that, also in the second to fourth embodiments, the composite vibrator 2 including the three piezoelectric element portions 31, 32 and 81 may be used.

Note that, in the above first to fifth embodiments of the present invention, the recesses 6 and 7 are formed in the end portions of the two stators 3 and 4, respectively, and each of the end portions of the rotors A and B is formed in a convex shape. Conversely, each of the end portions of the stators 3 and 4 may be formed in a convex shape, and the end portions of the rotors A and B may be provided with recesses, respectively.

Further, according to the first to fifth embodiments of the present invention, the contact portions of the two stators 3 and 4 abutting to the corresponding rotors A and B, respectively, can be formed into different shapes or different sizes with respect to each other. As a result, torques of different magnitudes can be generated in the rotors A and B.

Further, instead of stators, the contact portions of the two rotors abutting to the corresponding stators may be formed in different shapes or different sizes with respect to each other, thereby it is possible to cause the torques generated in the rotors A and B to be different from each other.

Note that, in the above first to fifth embodiments, the phases of the alternating current voltages applied to the piezoelectric element portions by the driving circuit 30 are shifted by 90 degrees with respect to each other, but the phases may be changed by any degrees other than 90 degrees. Further, a voltage value of the alternating current voltage applied may be changed. By controlling the alternating current voltage variously, it is possible to control the elliptical movements generated in the stators 3 and 4.

Further, contacts between the stators 3 and 4 and the corresponding rotors A and B, respectively, are performed in the corner portions, but this structure is not obligatory. As long as the elliptical movement can be transmitted, the contacts may be performed on planes or curved surfaces and are not necessarily performed in the annular portions.

Further, in the above first to fifth embodiments of the present invention, instead of the longitudinal vibration in the Z-axis direction and the flexural vibrations of the Y-axis direction and the X-axis direction, the composite vibration combining the plurality of vibrations which are not perpendicular to each other can be generated to thereby rotate the two rotors A and B.

Further, in the above embodiments, the flexural vibration in the X-axis direction, the flexural vibration in the Y-axis direction, and the longitudinal vibration in the Z-axis direction are generated by different piezoelectric element portions, and the composite vibration is generated by combining the vibrations. However, one piezoelectric element portion may be divided into a plurality of portions, each of which is polarized, to separately control voltages applied to electrodes corresponding to the polarized portions. That is, the voltages in which alternating current voltages different from each other in phases and amplitudes or the like are mutually combined may be applied to the electrodes to generate a composite vibration by a single piezoelectric element portion.

Further, in the above embodiments, the elliptical movement is caused in the contact portion between the stator and the rotor. However, a circular movement may be caused in the contact portions by controlling amplitudes in respective axial directions thereof.

The invention claimed is:

1. A vibration actuator, comprising:
   two stators;
   two rotors arranged so as to be in contact with the two stators;
   a single vibration means arranged between the two stators for generating a composite vibration combining a plurality of vibrations in different directions to vibrate the two stators, thereby rotating the two rotors at the same time; and
   a preload means including at least one attracting member which passes through rotation centers of the two rotors regardless of rotation angles of the two rotors and has flexibility, the preload means pressurizing the two rotors against the corresponding stators, respectively, through tension of the attracting member.

2. A vibration actuator according to claim 1, wherein the attracting member comprises a thread-like rubber member having elasticity.

3. A vibration actuator according to claim 1, wherein the preload means comprises:
   at least one wire member as the attracting member; and
   at least one spring member which is connected to one end portion of the corresponding wire member to generate a tension in the wire member.

4. A vibration actuator according to claim 1, wherein the preload means further comprises a tension adjusting means for adjusting the tension of the attracting member.

5. A vibration actuator according to claim 1, wherein the preload means comprises the single attracting member which is common to the two rotors, the attracting member being connected at one end portion thereof to one of the rotors and passing through one of the stators, the vibration means and another of the stators and being connected at another end portion thereof to another of the rotors.

6. A vibration actuator according to claim 1, wherein the preload means comprises the two attracting members corresponding to the two rotors,
   each of the attracting members being connected at one end portion thereof to the corresponding rotor and being connected at another end portion thereof to the stator corresponding to the rotor.

7. A vibration actuator according to claim 1, wherein each of the rotors comprises:
   a contact surface formed in a portion abutting to the corresponding stator and having a spherical shape with a rotation center of the rotor being a center thereof, an opening extending from the contact surface to the rotation center; and
   an engagement portion formed at the rotation center,
   the attracting member being connected to the rotor on an opposite side of the corresponding stator with respect to the rotation center of the rotor, being in contact with the engagement portion of the rotor to be deflected and extending to the corresponding stator through the opening of the rotor.

8. A vibration actuator according to claim 7, wherein the opening is formed in a slit-like shape so as to extend from the contact surface to the rotation center of the corresponding rotor.

9. A vibration actuator according to claim 8, wherein the opening has a sectional shape which widens in a fan shape from the rotation center toward the contact surface of the corresponding rotor.

10. A vibration actuator according to claim 8, wherein the opening has a sectional shape of a semicircular shape around the rotation center of the corresponding rotor.

11. A vibration actuator according to claim 1, wherein the vibration means comprises a composite vibrator including a plurality of piezoelectric element plates stacked on each other,
    the two stators being arranged on both end portions of the composite vibrator in a stacking direction of the piezoelectric element plates, respectively.

12. A vibration actuator according to claim 1, further comprising a driving circuit for driving the vibration means, the driving circuit selecting a combination of vibration modes of a plurality of vibrations constituting the composite vibration generated by the vibration means to thereby rotate the two rotors in one of the same direction and the opposite directions with respect to each other.

13. A vibration actuator according to claim 1, wherein the vibration means generates the composite vibration to cause elliptical movements in contact portions of the stators abutting to the corresponding rotors so that the two rotors are rotated at the same time.

14. A vibration actuator according to claim 1, wherein the vibration means generates the composite vibration to cause circular movements in contact portions of the stators abutting to the corresponding rotors so that the two rotors are rotated at the same time.

* * * * *